Figure 1:
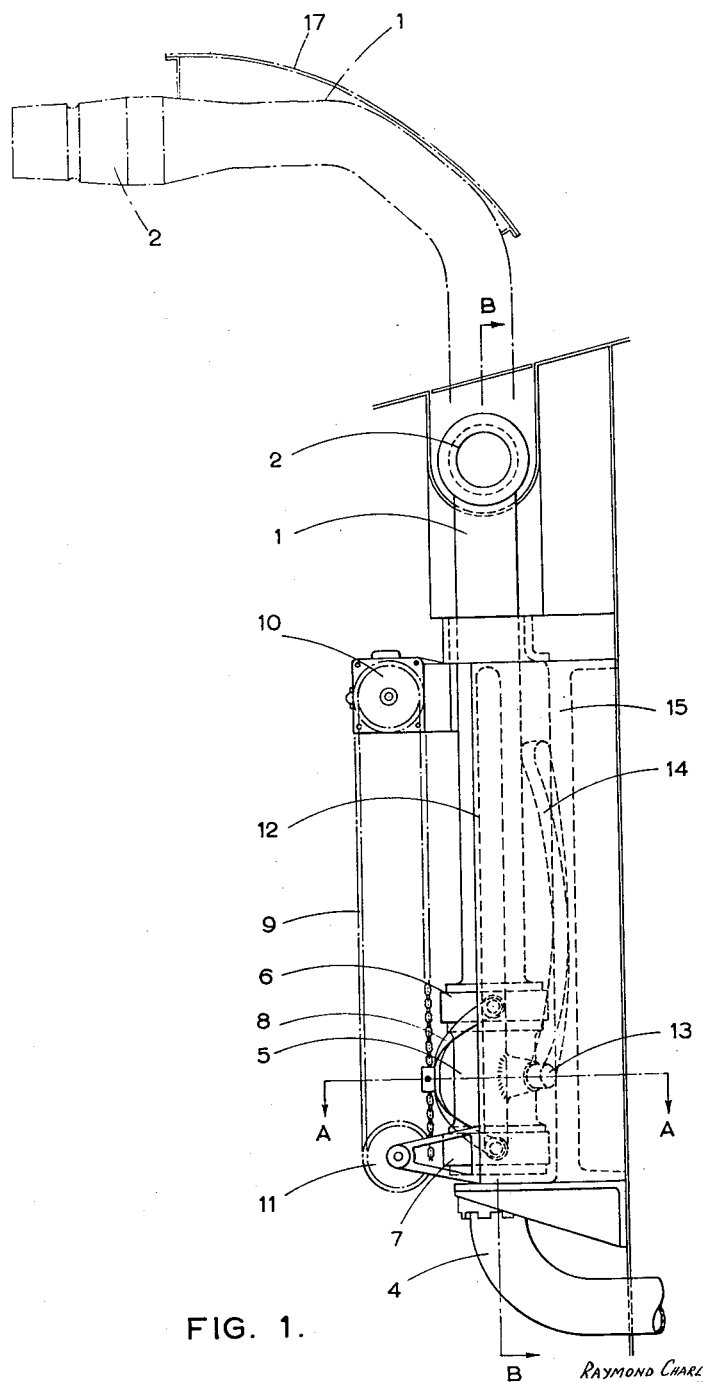

May 1, 1962 R. C. S. GADD 3,032,300
PROBES FOR USE IN REFUELLING AIRCRAFT IN FLIGHT
Filed June 22, 1959 3 Sheets-Sheet 1

RAYMOND CHARLES STEPHEN GADD
INVENTOR.

by Richardson, David and Nardon
ATTORNEYS.

May 1, 1962     R. C. S. GADD     3,032,300
PROBES FOR USE IN REFUELLING AIRCRAFT IN FLIGHT
Filed June 22, 1959     3 Sheets-Sheet 2
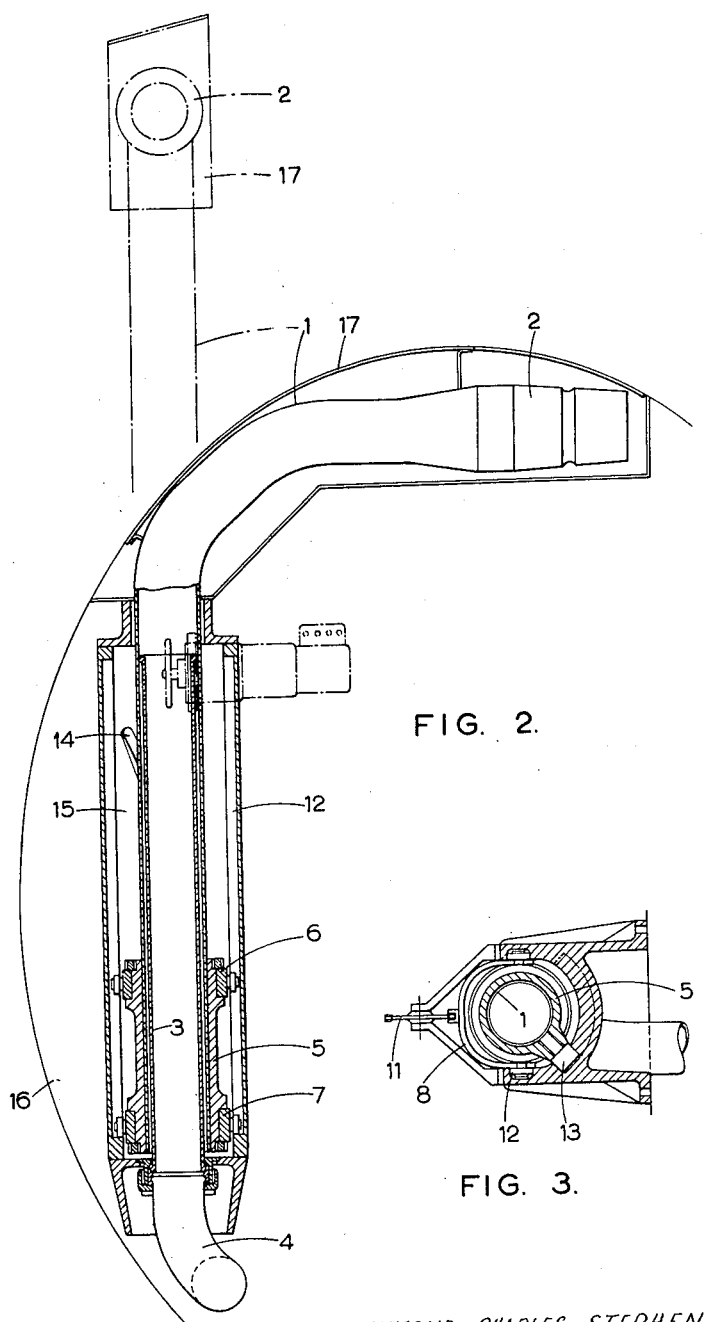
RAYMOND CHARLES STEPHEN GADD
INVENTOR.
by
Richardson, David and Nerdon
ATTORNEYS.

United States Patent Office 3,032,300
Patented May 1, 1962

3,032,300
PROBES FOR USE IN REFUELLING AIRCRAFT IN FLIGHT
Raymond Charles Stephen Gadd, Brough, England, assignor to Blackburn Aircraft Limited, Brough, England, a British company
Filed June 22, 1959, Ser. No. 822,074
6 Claims. (Cl. 244—135)

This invention relates to probes or fuel intake members for use in re-fuelling aircraft in flight.

With an air-intake to a turbine engine in the nose of the aircraft fuselage, it is difficult to provide a fuel intake probe at that point as is customary, and also when the nose of the fuselage contains a radar installation a probe cannot be mounted in front of it, yet it is not always convenient to provide the probe in the leading edge of a wing as is done in some designs of aircraft.

It is desirable that the probe should not normally project into the airstream and so create drag, and further that it should be foreward of the pilot, without obstructing his view, to facilitate his manoeuvering his aircraft to enter the probe into the cone of the drogue trailed by the tanker aircraft.

Now the object of the present invention is to provide a retractable probe, satisfying these desirable features, which may be accommodated in the restricted space available in the nose of the fuselage of an aircraft clear of any radar installation or an air-intake to a turbine engine therein.

To this end according to the present invention, the probe is located towards one side of the nose of the aircraft fuselage and is movable between extended and retracted positions by displacement with rotation. In this way the probe may be retracted within the fuselage, with its free or valve end extending transversely, into a space such as between an internal wall, comprising for example the casing of a radar installation or the wall of an air-intake duct, and the skin of the fuselage forwardly of the cock-pit. Then on extending the probe into operative position it is moved bodily and also rotated whereby its valve end is disposed forward facing and at a distance from the skin of the aircraft fuselage to enable that end to enter the cone of the drogue trailed by a tanker aircraft without risk of such cone striking the fuselage. This engagement of the probe with the cone is facilitated due to the favourable placing of the probe forwardly of the pilot without interfering with his straight ahead view.

More particularly the fuel-intake probe according to the present invention comprises a substantially L-shaped tubular member, having one end conventionally shaped and provided with the usual valve arrangement, which telescopes with respect to a fixed tube and is connected to a linearly displaceable part through the intermediary of a part, fast with such tubular member, engaging means for effecting rotation of the member as a function of its displacement on movement of the displaceable part.

In one embodiment of the invention, the tubular probe member is conveniently fast with a sleeve-like part carrying a rotatable ring or rings which is or are connected to the displaceable part, which may be the ram of a jack but maybe an endless chain extending between two sprocket wheels of which one may be driven to give the required linear movement of the part of the chain to which the ring (or rings) is connected. The sleeve-like part carries a stud or like projection which engages a helical groove in a fixed part so that it, and the probe, is thereby rotated as required as a function of its displacement during movement between its retracted and extended operative positions.

According to a modified installation, the probe is extended and retracted by means of a jack and its rotative movement is brought about by means of a radius rod connected at one end to a fixed part of the aircraft fuselage.

The probe in retracted position is accommodated in a recess in the fuselage and may carry a fairing closing such recess or partly closing such recess when a door, conveniently actuated by a jack, may close to remainder of the opening to such recess.

Figure 4:
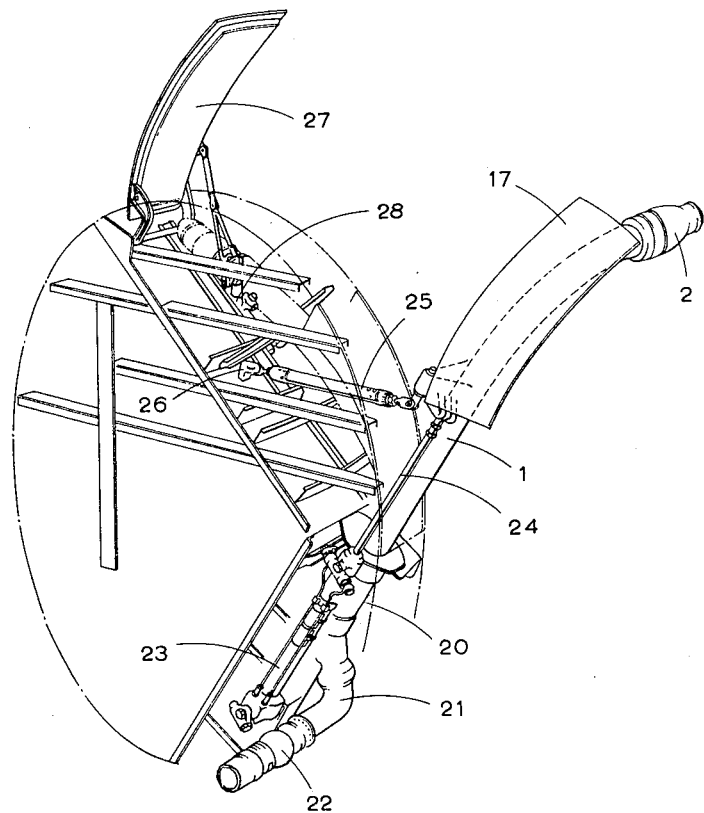

Now in order that the invention may be clearly understood and readily carried into effect an embodiment thereof is by way of example illustrated in the drawings accompanying this specification in which:

FIGURE 1 is a side elevation with the probe retracted, its extended position being shown in broken lines, FIGURE 2 is a sectional elevation on the line B—B of FIGURE 1, FIGURE 3 is a cross-section on the line A—A, and FIGURE 4 is a perspective view of a modified installation of probe with the probe shown in its extended operative position its stowed or retracted position being shown in broken lines.

Referring now to the said drawings and in particular to FIGURES 1 to 3 thereof, the fuel intake probe is formed as a substantially L-shaped tubular member 1 which at its free end 2 is conventionally shaped and provided with the usual valves. The main portion of the member 1 telescopes over a fixed tube 3 from which a conduit 4 leads to the aircraft fuel distribution system and so to its fuel tanks. Fast with the member 1 is a sleeve-like part 5 which carries a pair of freely rotatable rings 6, 7 which are interconnected by a bridge piece 8 which is connected to a chain 9 passing around two sprocket wheels 10, 11. The points of connection of the rings 6, 7 to the bridge piece 8 are conveniently extended as guide members working in the slot 12 constituting a guide way. The sleeve-like part 5 is formed with or carries a stud 13 which extends into a helical slot 14 in a fixed part 15.

One or other of the sprocket wheels 10, 11 is reversibly driven, and the effect of driving such wheel is to move the portion of the chain 9 to which the bridge piece 8 is connected linearly so that the rings 10, 11 aided by the guideway slot 12 move along in a straight line with the sleeve-like part 5. Due to the stud 13 working in the helical groove 14, the sleeve-like part 5 and with it the probe 1, is appropriately rotated.

The probe is accommodated towards one side of the nose of the fuselage forwardly of the pilots cock-pit between an internal wall (not shown) and the skin 16 of the fuselage with, in retracted position, the valve end 2 extending transversely as shown in FIGURES 1 and 2. When extended the valve end 2 is elevated clear of the fuselage skin 16 and directed forwardly as shown in broken lines.

In retracted position the valve end 2 of the probe is accommodated in a recess in the fuselage which is closed, or at least partly closed, by a fairing 17 which is carried by the probe.

In a modified installation of the probe similarly at one side of the nose of aircraft fuselage, illustrated in FIGURE 4 in which like parts to those already described bear like reference numerals, the probe 1 telescopes with respect to a fixed tube or casing 20 from which extends a branch conduit 21 containing a non-return valve 22 and leading to the aircrafts fuel tanks. Adjacent the tube 20 is the body 23 of a hydraulic jack the ram of which is connected by the rod 24 to the probe 1 to extend and retract the same, the lower end of the body 23 being pivoted. A radius rod 25 is connected at its one end to the probe 1 and at its other end through a joint 26 to a fixed part of the aircraft fuselage. The effect of this radius rod 25 is that, during extension and retraction of the probe 1, it oscillates the same between its extended operative position as shown in FIGURE 4 in which its valve end 2 faces forwardly at a distance from the fuselage and its retracted position shown in broken lines in a recess in the aircraft fuselage. The opening to such recess is closed partly by a fixed fairing 17 carried by the probe 1 with the remainder of the opening closed by a hinged door 27 which is moved between open and closed positions by means of a hydraulic jack 28. The actuation of this jack 28 may be such that the door 27 is opened to allow extension of the probe 1 and then closed while the extended probe 1 is in use for refuelling, being thereafter again opened for retraction of the probe 1, and finally closed to complete the closure to the recess in conjunction with the fairing 17 carried by the probe 1.

In the above described arrangement the whole probe 1 may be rotated by the radius rod 25 as a function of its extension and retraction movement, or the probe may be formed with a straight portion slidable with respect to the fixed tube 20 and a relatively rotatable curved portion terminating in the valve end 2 and carrying the fairing 17 with the end of the radius rod 25 connected to this curved portion to effect the turning movement of that portion as a function of the extension and retraction of the probe.

I claim:
1. An in-flight refuelling installation for an aircraft provided with a fuselage comprising a vertically disposed support part fixedly mounted in and attached to said fuselage toward one side of the nose portion thereof, an L-shaped rigid conduit probe having one arm slidably and rotatably mounted in said support part, and means for extending and retracting said probe outwardly of and into said fuselage and simultaneously rotatably oscillating said other arm respectively forwardly and transversely inwardly with respect to said fuselage.

2. An in-flight refuelling installation for an aircraft provided with a fuselage comprising a vertically disposed support part fixedly mounted in and attached to said fuselage toward one side of the nose portion thereof, an L-shaped rigid conduit probe having one arm slidably and rotatably mounted in said support part, and means for extending and retracting said probe outwardly of and into said fuselage and simultaneously rotatably oscillating said other arm respectively forwardly and transversely inwardly with respect to said fuselage, said means comprising a sleeve affixed to said one arm, a pair of rings rotatably mounted on said sleeve, said support part having a helical groove and a slot formed therein, a radially extending stud affixed to said sleeve and having its free end slidable in said groove, a pair of sprockets mounted on said support part adjacent said one arm, an endless chain entrained over said sprockets, a bridge interconnecting said rings and one flight of said chain, and means for reversibly moving one of said sprockets.

3. An in-flight refuelling installation for an aircraft provided with a fuselage comprising a vertically disposed support part fixedly mounted in and attached to said fuselage toward one side of the nose portion thereof, an L-shaped rigid conduit probe having one arm slidably and rotatably mounted in said support part, and means for extending and retracting said probe outwardly of and into said fuselage and simultaneously rotatably oscillating said other arm respectively forwardly and transversely inwardly with respect to said fuselage, said means comprising an hydraulic ram pivotally mounted adjacent the lower end of said support part and connected to said one arm, a radially extending arm affixed to said one arm, and a radius rod interconnecting said radially extending arm and said fuselage.

4. A device as defined in claim 1 wherein said other arm has mounted thereon a fairing and wherein said fuselage is provided with an opening for the movement therethrough of said probe, said fairing adapted to close said opening when said probe is in retracted position.

5. A device as defined in claim 2 wherein said other arm has mounted thereon a fairing and wherein said fuselage is provided with an opening for the movement therethrough of said probe, said fairing adapted to close said opening when said probe is in retracted position.

6. A device as defined in claim 3 wherein said other arm has mounted thereon a fairing and wherein said fuselage is provided with an opening for the movement therethrough of said probe, said fairing adapted to close said opening when said probe is in retracted position.

References Cited in the file of this patent

FOREIGN PATENTS 695,200     Great Britain _____ Aug. 5, 1953

OTHER REFERENCES

Aviation Week Magazine, vol. 67, No. 2, page 115 relied upon; July 15, 1957.